(12) United States Patent
Nelson et al.

(10) Patent No.: US 11,064,783 B2
(45) Date of Patent: *Jul. 20, 2021

(54) BATTERY OPERATED HAIR DRYER

(71) Applicant: Follicle, Inc., Milwaukee, WI (US)

(72) Inventors: Eric Nelson, Whitefish Bay, WI (US); Christopher Rebholz, Delafield, WI (US); Erik Stafl, San Francisco, CA (US); James Meredith, San Francisco, CA (US); David Kirkland, San Francisco, CA (US)

(73) Assignee: Follicle, Inc., Milwaukee, WI (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/379,469

(22) Filed: Apr. 9, 2019

(65) Prior Publication Data
US 2019/0231049 A1 Aug. 1, 2019

Related U.S. Application Data

(63) Continuation of application No. 15/951,786, filed on Apr. 12, 2018, now Pat. No. 10,299,560.
(Continued)

(51) Int. Cl.
*A45D 20/12* (2006.01)
*H01M 10/0525* (2010.01)
(Continued)

(52) U.S. Cl.
CPC ........... *A45D 20/12* (2013.01); *F24H 3/0423* (2013.01); *H01M 10/0525* (2013.01);
(Continued)

(58) Field of Classification Search
CPC . A45D 20/12; A45D 2020/128; H02J 7/0014; H02J 7/0016; H02J 7/0091; H02J 7/0025; H01M 10/0525; H01M 10/48; H01M 2/0202; H01M 2010/4271; H01M 2/1022; H01M 10/052; H01M 10/482; H01M 10/486; H01M 10/425; H01M 2220/30; F24H 3/0423; Y02E 60/10
See application file for complete search history.

(56) References Cited

U.S. PATENT DOCUMENTS 4,711,988 A 12/1987 Thaler
5,507,103 A 4/1996 Merritt
(Continued)

FOREIGN PATENT DOCUMENTS

CN 202959231 U 5/2012
CN 205492920 U 4/2016
(Continued)

OTHER PUBLICATIONS

Written Opinion of the International Searching Authority for PCT Application No. PCT/US2018/027435 dated Jul. 3, 2018.
(Continued)

*Primary Examiner* — Jessica Yuen
(74) *Attorney, Agent, or Firm* — James Joyce; Godfrey & Kahn, S.C.

(57) ABSTRACT

A battery operated hair dryer includes a battery management and control module to control how to efficiently dry a user's hair while maintaining the health and charge of the battery.

9 Claims, 12 Drawing Sheets

Related U.S. Application Data

(60) Provisional application No. 62/584,528, filed on Nov. 10, 2017.

(51) Int. Cl.
  *H01M 10/48* (2006.01)
  *F24H 3/04* (2006.01)
  *H01M 50/10* (2021.01)
  *H01M 10/42* (2006.01)
  *H02J 7/00* (2006.01)

(52) U.S. Cl.
  CPC ........... *H01M 10/48* (2013.01); *H01M 50/10* (2021.01); *H02J 7/0014* (2013.01); *A45D 2020/128* (2013.01); *H01M 2010/4271* (2013.01)

(56) References Cited

U.S. PATENT DOCUMENTS

| | | | |
|---|---|---|---|
| D399,026 S | 9/1998 | Kip | |
| 6,449,870 B1 | 9/2002 | Perez | |
| 6,518,725 B2 | 2/2003 | Marten | |
| 6,718,651 B2 | 4/2004 | Perez et al. | |
| 7,123,823 B2 | 10/2006 | Ceva | |
| D535,746 S | 1/2007 | Grove et al. | |
| 7,380,347 B2 | 6/2008 | Coats et al. | |
| 7,926,198 B2 | 4/2011 | Merritt | |
| 8,146,264 B1 | 4/2012 | Stefano et al. | |
| 8,387,271 B2 | 3/2013 | Shami et al. | |
| 8,480,724 B2 | 7/2013 | Bly | |
| 8,890,035 B2 | 11/2014 | Scheunert et al. | |
| D729,978 S | 5/2015 | Bates et al. | |
| 9,362,757 B2 | 6/2016 | Deal et al. | |
| 9,498,039 B2 | 11/2016 | Matsui et al. | |
| 9,512,959 B2 | 12/2016 | Atkinson | |
| 9,526,311 B1 | 12/2016 | Schaefer et al. | |
| 10,141,550 B2 * | 11/2018 | Robert | H01M 2/0262 |
| 10,299,560 B1 * | 5/2019 | Nelson | H01M 2/1022 |
| 2007/0220773 A1 | 9/2007 | Evanyk et al. | |
| 2008/0116753 A1 | 5/2008 | Carlucci | |
| 2010/0101110 A1 | 4/2010 | Lee | |
| 2011/0181247 A1 * | 7/2011 | Park | H02J 7/0021 320/118 |
| 2012/0125909 A1 | 5/2012 | Scheunert et al. | |
| 2013/0133218 A1 | 5/2013 | Hadden | |
| 2013/0291394 A1 | 11/2013 | Shami et al. | |
| 2013/0326898 A1 | 12/2013 | Quessard et al. | |
| 2014/0186686 A1 | 7/2014 | Takahashi | |
| 2015/0223582 A1 | 8/2015 | Pedroarena | |
| 2016/0166036 A1 | 6/2016 | Li | |
| 2016/0300853 A1 * | 10/2016 | Yamazaki | G09G 3/20 |
| 2016/0302548 A1 | 10/2016 | Yamazaki | |
| 2017/0035174 A1 | 2/2017 | Pedroarena | |
| 2017/0098875 A1 * | 4/2017 | Kim | H01M 10/6563 |
| 2017/0112258 A1 | 4/2017 | Blanc et al. | |
| 2018/0027940 A1 | 2/2018 | Goldman | |
| 2018/0031318 A1 * | 2/2018 | Goldman | A45D 20/10 |
| 2018/0036553 A1 | 2/2018 | Shiibashi | |

FOREIGN PATENT DOCUMENTS

| | | |
|---|---|---|
| DE | 102013223320 | 6/2015 |
| GB | 2156007 | 10/1985 |
| KR | 100935158 B1 | 1/2010 |
| KR | 200456915 Y1 | 1/2010 |
| TW | 514771 U | 1/2016 |
| WO | 9901049 A1 | 1/1999 |
| WO | 2007010321 A1 | 1/2007 |
| WO | 2015046763 A1 | 4/2015 |

OTHER PUBLICATIONS

"MoistureProtect: Dryer," Philips Haircare, mea.philips.com, HP8280/03; http://www.mea.philips.com/c-p/HP8280_03/moistureprotect-dryer#see-all-benefits; accessed: Jul. 2017.

"Technique Tourmaline Ceramic Hair Dryer," FHI Brands, fhibrands.com; https://www.fhibrands.com/products/Nano_Weight_Pro_1850-115-1.html; accessed: Jul. 2017.

Extended Search Report for European Patent Application No. EP 18 85 9959 dated Aug. 6, 2019.

Office Action for Korean Patent Application No. 10-2019-7031885 dated Sep. 22, 2020.

* cited by examiner

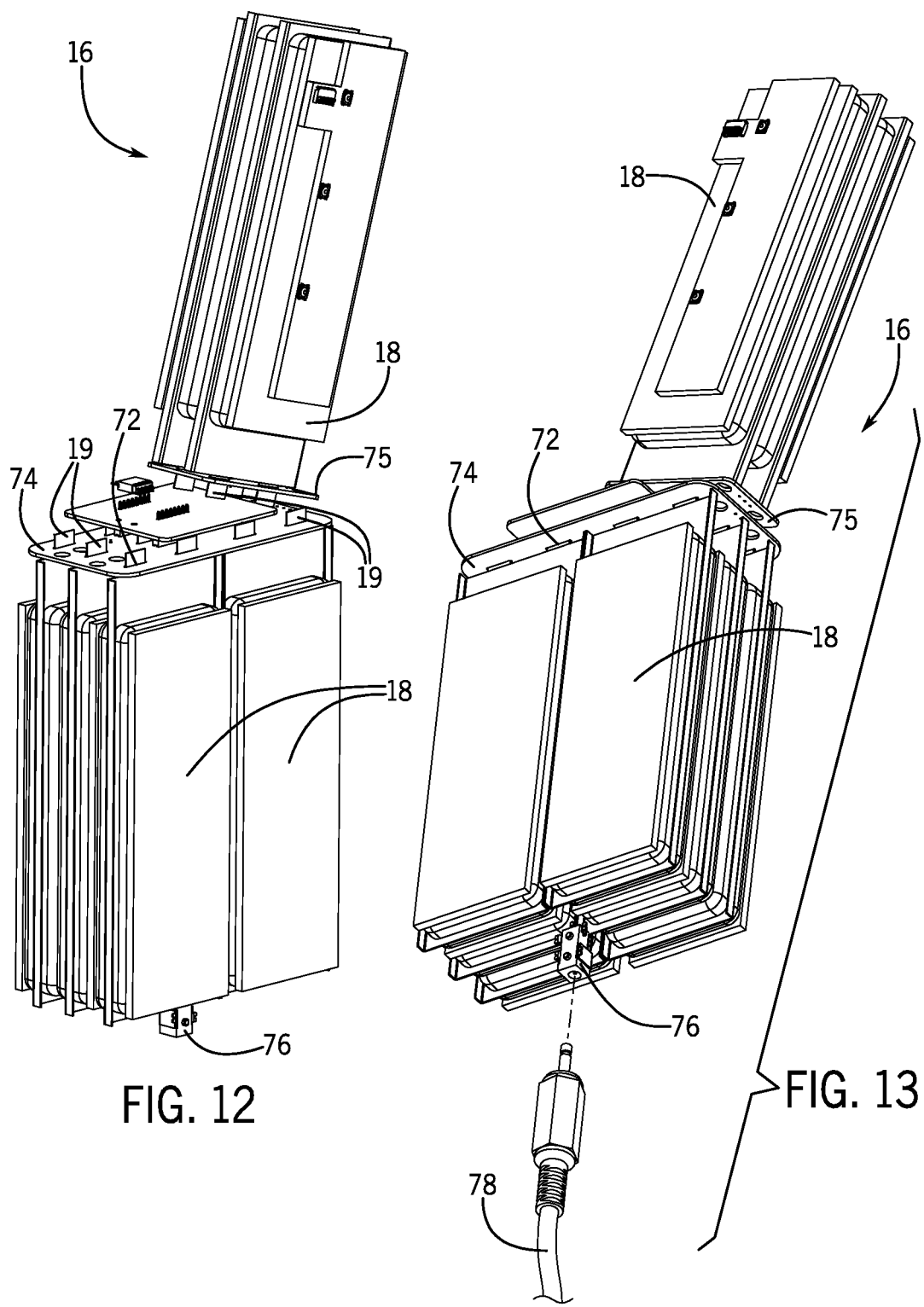

BATTERY OPERATED HAIR DRYER

CROSS-REFERENCE TO RELATED APPLICATION

This application is a continuation of U.S. patent application Ser. No. 15/951,786 filed on Apr. 12, 2018, which is based on and claims priority to U.S. Provisional Patent Application No. 62/584,528 filed on Nov. 10, 2017, which is incorporated herein by reference in its entirety for all purposes.

FIELD OF THE INVENTION

The present invention relates generally to the field of electric handheld hair dryers, and specifically to a battery operated handheld hair dryer.

BACKGROUND

In general, hair dryers, also called "blow dryers" are well known. Typical handheld hair dryers blow ambient air or heated air over damp hair to accelerate the evaporation of water particles, thereby drying the hair more quickly than it would dry on its own. Typical hair dryers are powered by electricity from the power grid, that is, they are almost always plugged into a wall socket to get power. Typical hair dryers include two key components: a fan and a heating element downstream from the fan that selectively heats air as it is blown past by the fan. The first handheld, household hair dryers were introduced in the first half of the 20$^{th}$ century, and have only changed slightly in almost 100 years.

Hair dryer performance can be measured a number of different ways, but the most common measurements include air flow rate, velocity of the air as it leaves the hair dryer, and how much the air temperature increases relative to the ambient air temperature.

Existing hair dryers include a fan and at least one electric heating coil. The electric heating coils generate heat through the process of resistive heating. Electric current passing through the heating element is resisted by a coil of wire that results in the generation of heat. Resistance heating elements are typically made of wire or ribbon that may be straight, coiled, or formed into any other suitable shape. Resistive heating elements demand large amounts of electric current to generate heat sufficient to dry hair. As a result, hair dryers that use resistive heating elements have historically not been well suited to be powered by batteries.

Typical hair dryers also include switches that allow a user to control basic functions of the hair dryer. For example, typical hair dryers may include "hi" "low" and "off" settings for heat, and a "hi" and "low" setting for the fan. The aforementioned basic settings are adequate for hair dryers that draw electricity from the power grid, and until now there has been little motivation to better optimize performance of the hair dryer from the perspective of maintaining battery charge.

Until now, batteries capable of generating sufficient power (voltage×current) for a sufficient period of time to enable reliable hair drying performance have been prohibitively heavy, large, and expensive. Meanwhile, existing hair dryers, although lightweight, suffer from being tethered to a power outlet. Furthermore, a user drying their hair must move the hair dryer continuously around their head, and the power cord is often a nuisance.

As such, there is a need for a battery operated hair dryer that includes a battery management system to allow the hair dryer to efficiently dry hair while maintaining a maximum battery charge in a lightweight, inexpensive package.

SUMMARY

The present invention relates to a battery operated hair dryer. The hair dryer has a housing which contains all of the components of the hair dryer. A battery pack including at least one battery cell is included in the housing and is electrically connected to a battery management and control module. The hair dryer also includes at least one switch to control the operation of the hair dryer. A heating assembly is disposed within the housing and includes a fan attached to an electric motor. The heating assembly also includes at least one heating element. The motor is driven by electrical current from the battery pack and turns the fan, which draws ambient air into an inlet and expels air through an outlet. The heating element is positioned such that air passing through the heating assembly may be heated to a temperature greater than the ambient air temperature. The battery management and control module is electrically connected to the heating assembly and adjusts the amount of current delivered from the battery pack to the fan and the heating element so that the drying performance of the hair dryer is optimized, while maintaining the charge and health of the battery pack.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 12 is a perspective view of one embodiment of a battery pack in accordance with the invention;

FIG. 13 is another perspective view of the battery pack of FIG. 11;

DETAILED DESCRIPTION

Figures 1, 2:
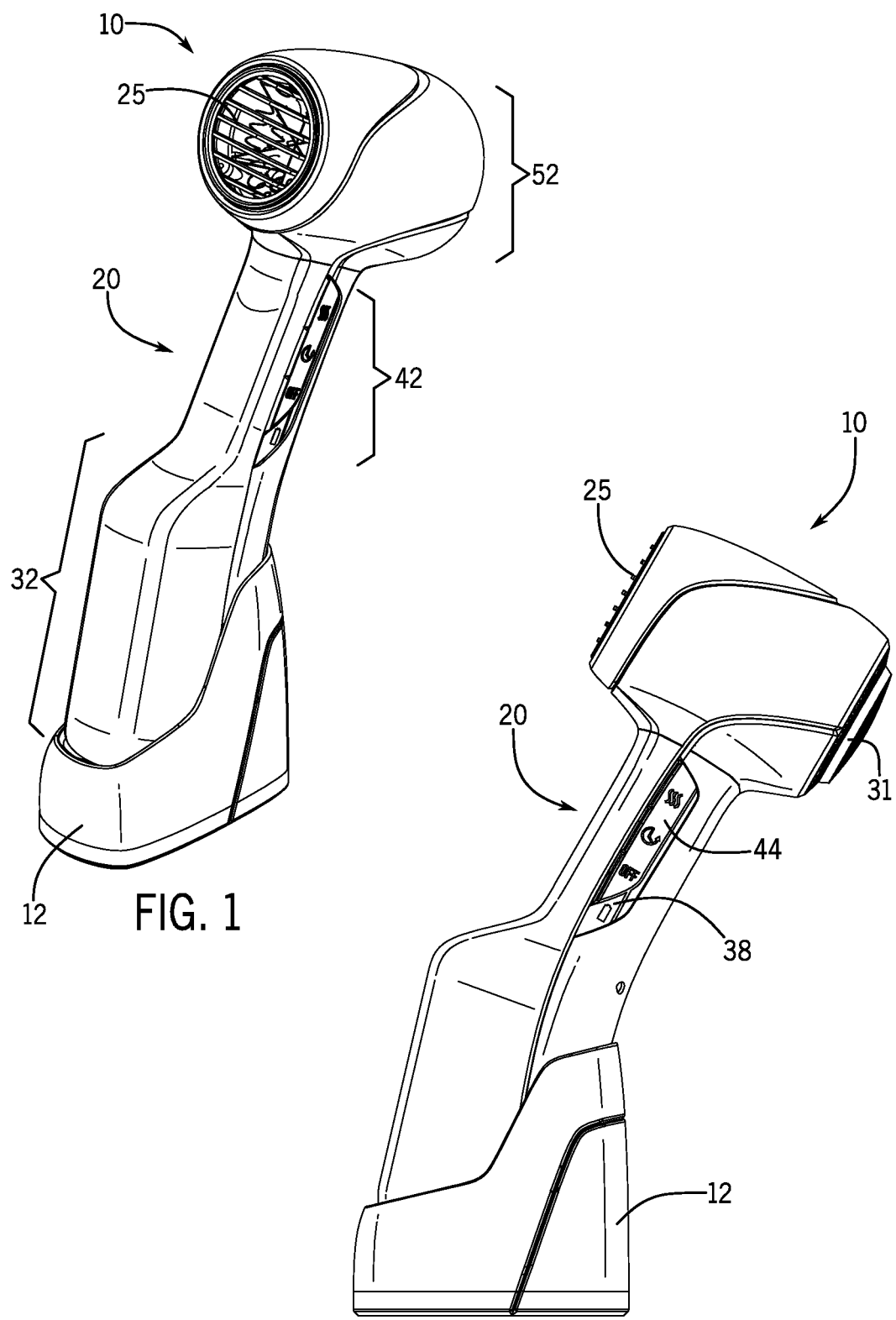
FIG. 1 is a perspective view of one embodiment of a battery operated hair dryer in accordance with the invention.
FIG. 2 is side view of the battery operated hair dryer of FIG. 1.

Referring now to the drawing figures, the invention provides a battery operated hair dryer 10. Hair dryer 10 includes a main housing 20 that encloses all of the components of the hair dryer. FIGS. 1-2 show hair dryer 10 resting in an optional storage cradle 12, that provides support to the hair dryer when it is not in use, allowing the hair dryer to occupy a minimal amount of counter space. In some embodiments, storage cradle 12 may also provide power to hair dryer 10 when the hair dryer is stored in the storage cradle.

Hair dryer 10 includes three subsystems enclosed in main housing 20 that enable the hair dryer to function: (1) a battery pack 16, (2) a battery management and control module 40, and (3) a heating assembly 50. As shown in the exploded view of FIG. 3, main housing 20 defines an enclosure that encloses all of the components of the hair dryer 10. In general, battery pack 16 is located in a bottom section 32 of main housing 20. In the embodiment shown, part of battery pack 16 is also located in a middle section 42, which also includes control switches 44 and a battery indicator 38. Heating assembly 50 is located in a top section 52 of main housing 20. Heating assembly 50 includes at least one heating element 54, at least one fan 56, and other components that will be described in detail below. In the embodiment shown, battery management and control module 40 is disposed substantially between top section 52 and middle section 42. In the embodiment shown, battery management and control module 40 comprises a printed circuit board that creates a physical barrier between the top section 52 and the middle section 42. Although battery management and control module 40 creates a barrier between top section 52 and middle section 42 in the present embodiment, other means of separating the top section and the middle section may alternatively be used without departing from the invention. In some embodiments, it may also be desirable to direct air through middle section 42 and bottom section 32 to improve battery performance or for any other purpose.

Figure 3:
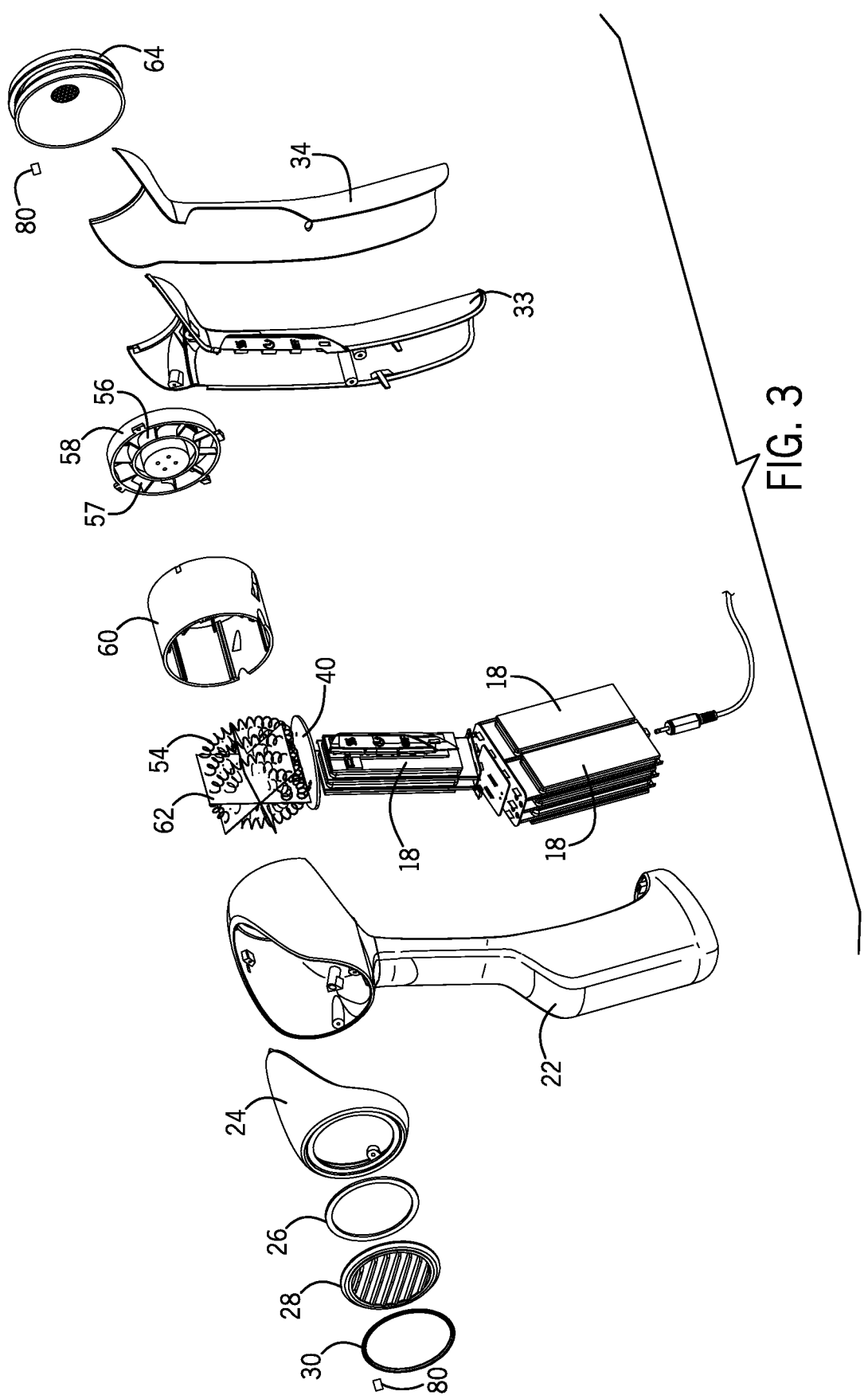
FIG. 3 is an exploded perspective view of the battery operated hair dryer of FIG. 1.
Figure 14:
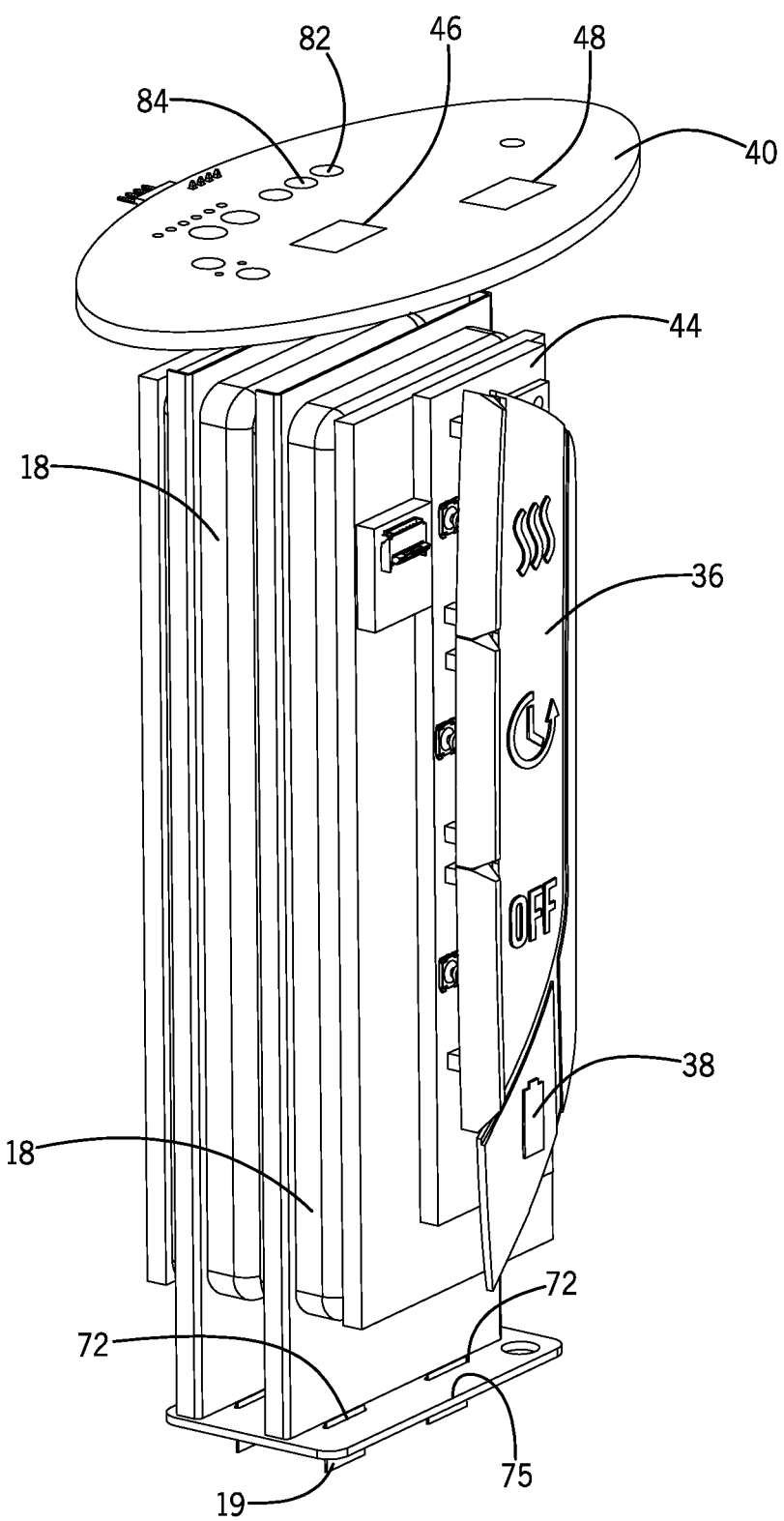
FIG. 14 is a perspective view of one embodiment of battery cells, a battery management module, and a switch module in accordance with the invention.
Figure 15:
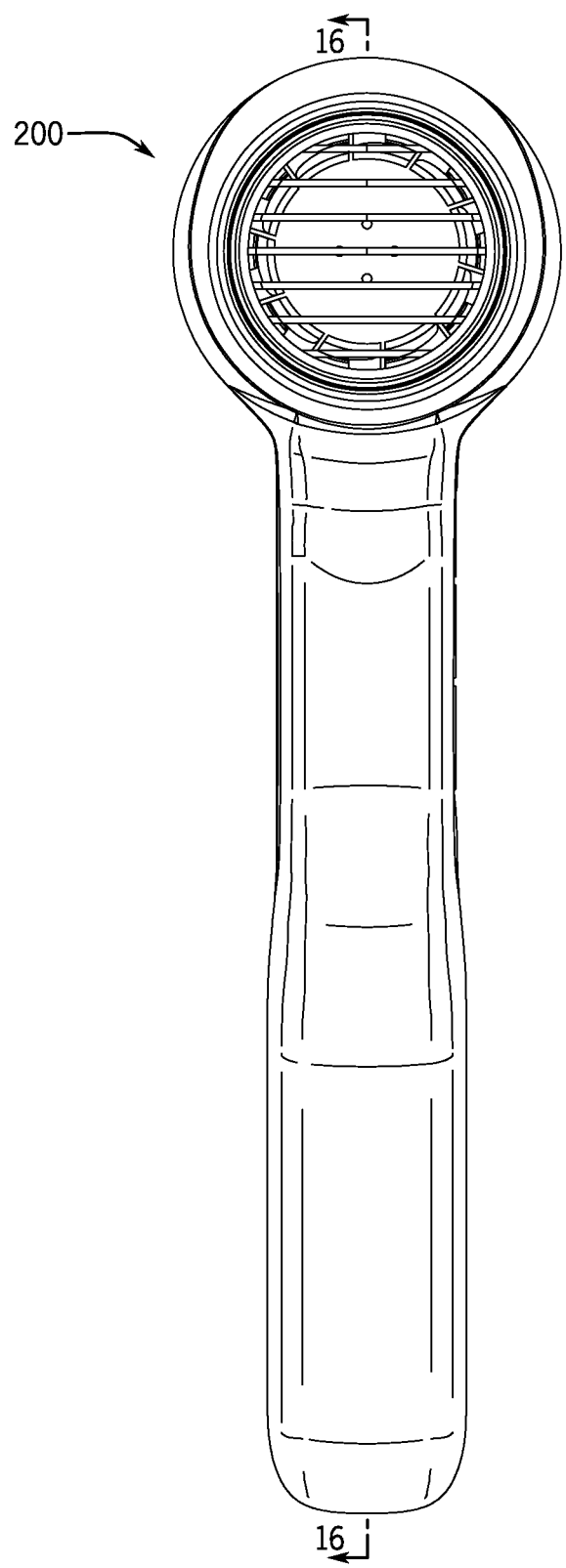
FIG. 15 is a front view of one embodiment of a battery operated hair dryer in accordance with the invention.
Figure 16:
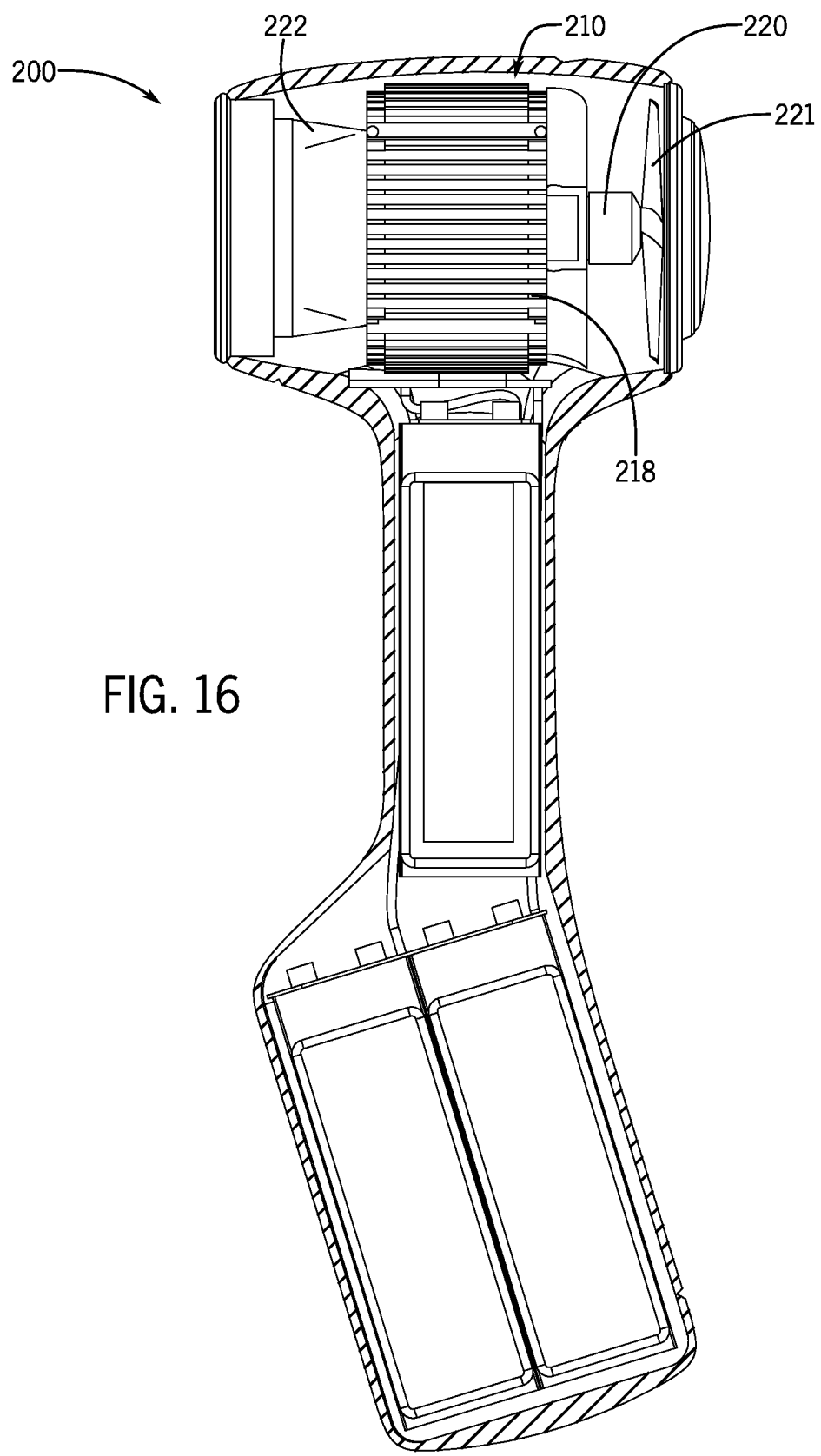
FIG. 16 is a side section view of the battery operated hair dryer of FIG. 15, taken generally along the line 16-16 in FIG. 15.
Figure 17:
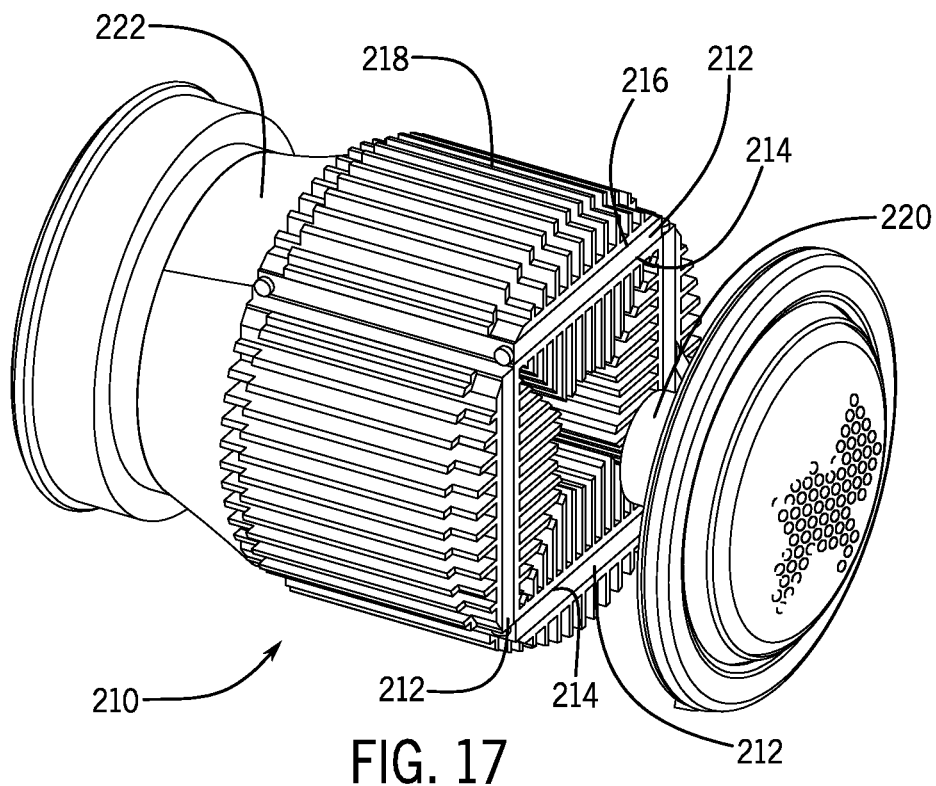
FIG. 17 is a perspective view of one embodiment of a heating module for the battery operated hair dryer of FIG. 14.
Figure 18:
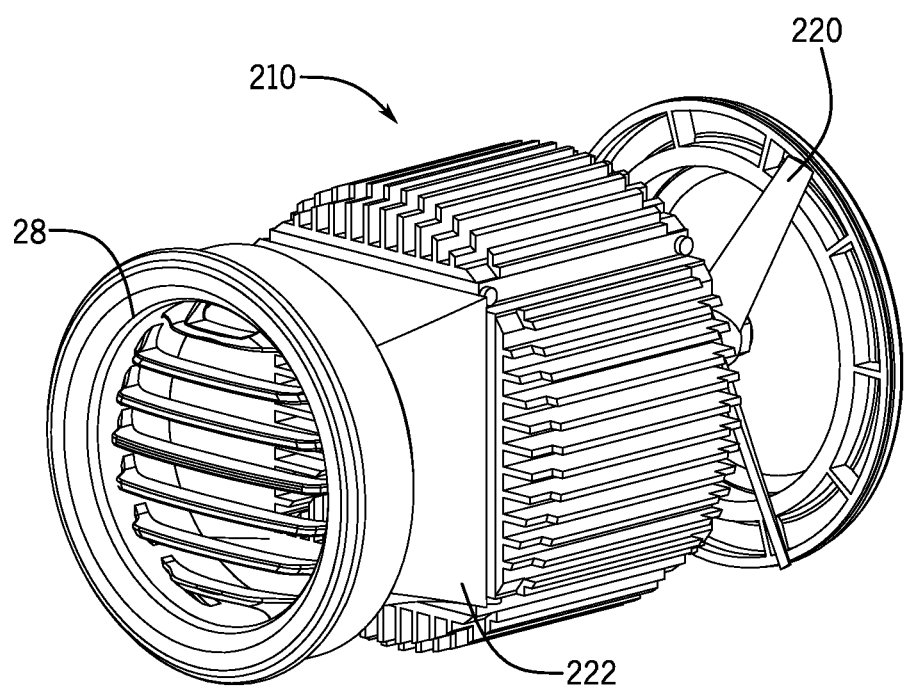
FIG. 18 is another perspective view of the heating module of FIG. 15.

Continuing with FIG. 3, main housing 20 includes a base 22, an outlet 25 (see FIG. 1), an outlet cover 24, a light ring 26, an outlet grille 28, a retention ring 30, and a back cover 33. An optional grip 34 is also shown that may be overmolded onto back cover 33 or otherwise attached to the back cover. In the embodiment shown, grip 34 is made of silicone, but any suitable material may be used without departing from the invention. Grip 34 provides a non-slippery surface that helps a user securely hold onto hair dryer 10, particularly with wet hands. Also attached to back cover 33 is a flexible switch cover 36. In the embodiment shown, switch cover 36 is made of a unitary piece of flexible material. Alternative embodiments may include different switch covers or switch configurations without departing from the invention. In the embodiment shown, a battery indicator 38 is located below flexible switch cover 36 (see FIG. 14). Of course, the battery indicator 38 may be located at any other suitable location without departing from the invention. Battery indicator 38 displays the level of charge of the battery pack 16. Battery indicator 38 may display charge in any suitable way without departing from the invention. For example, in some embodiments, battery indicator 38 may change color depending on whether the battery is being charged or if the battery charge is low. In other embodiments, battery indicator 38 may be comprised of multiple LED's that selectively illuminate depending on the level of charge.

Figure 4:
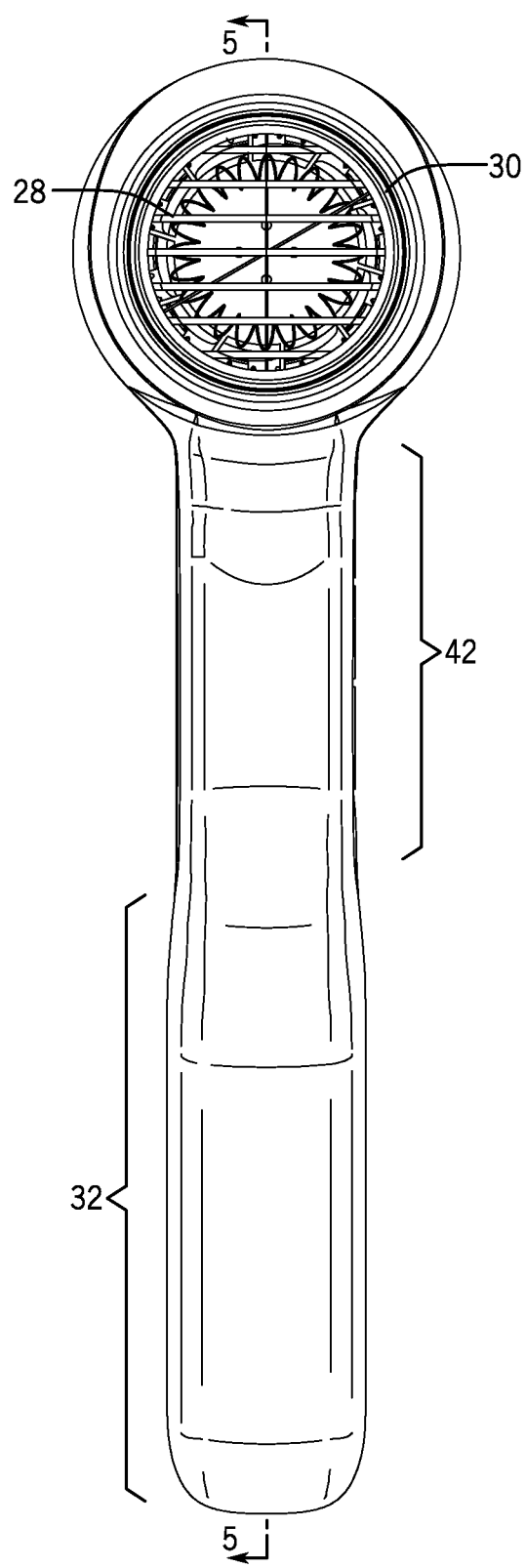
FIG. 4 is a front view of the battery operated hair dryer of FIG. 1.
Figures 5, 6:
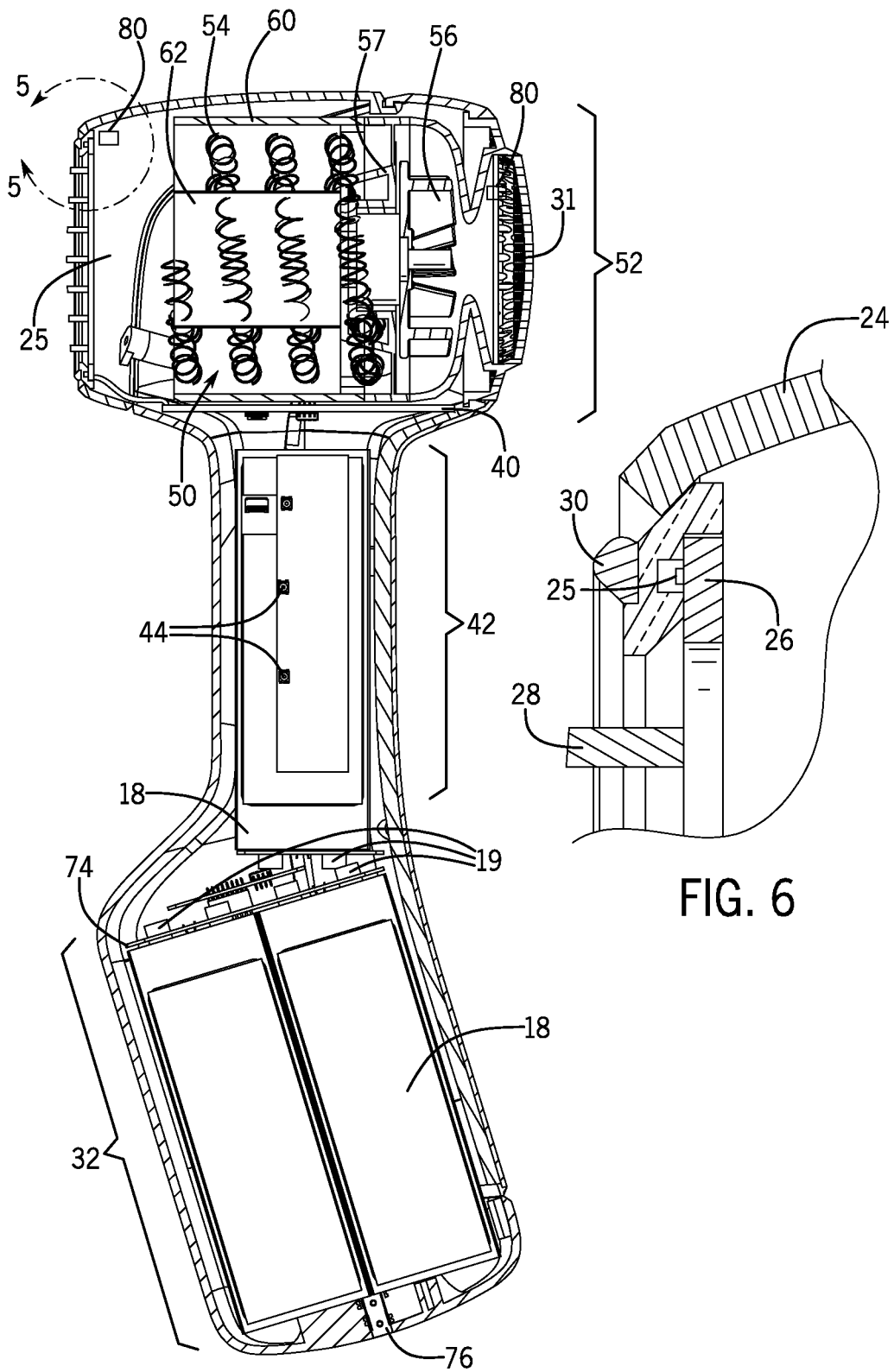
FIG. 5 is a section view of the battery operated hair dryer of FIG. 1 taken generally along the line 5-5 in FIG. 4.
FIG. 6 is a detail view taken generally along the line 6-6 in FIG. 5 showing a light ring and outlet grille.
Figure 7:
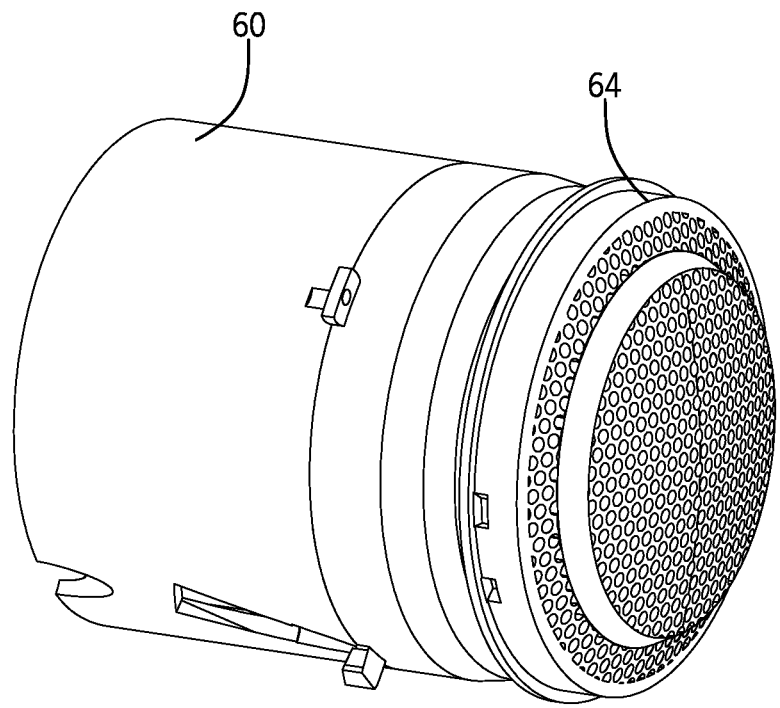
FIG. 7 is a perspective view of one embodiment of a heating assembly in accordance with the invention.
Figure 8:
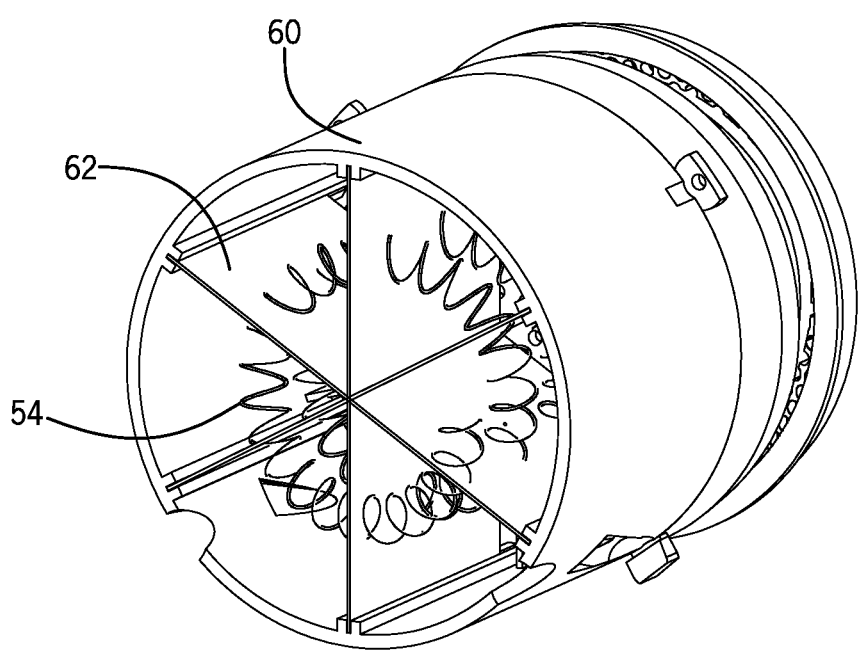
FIG. 8 is another perspective view of the heating assembly of FIG. 6.
Figure 9:
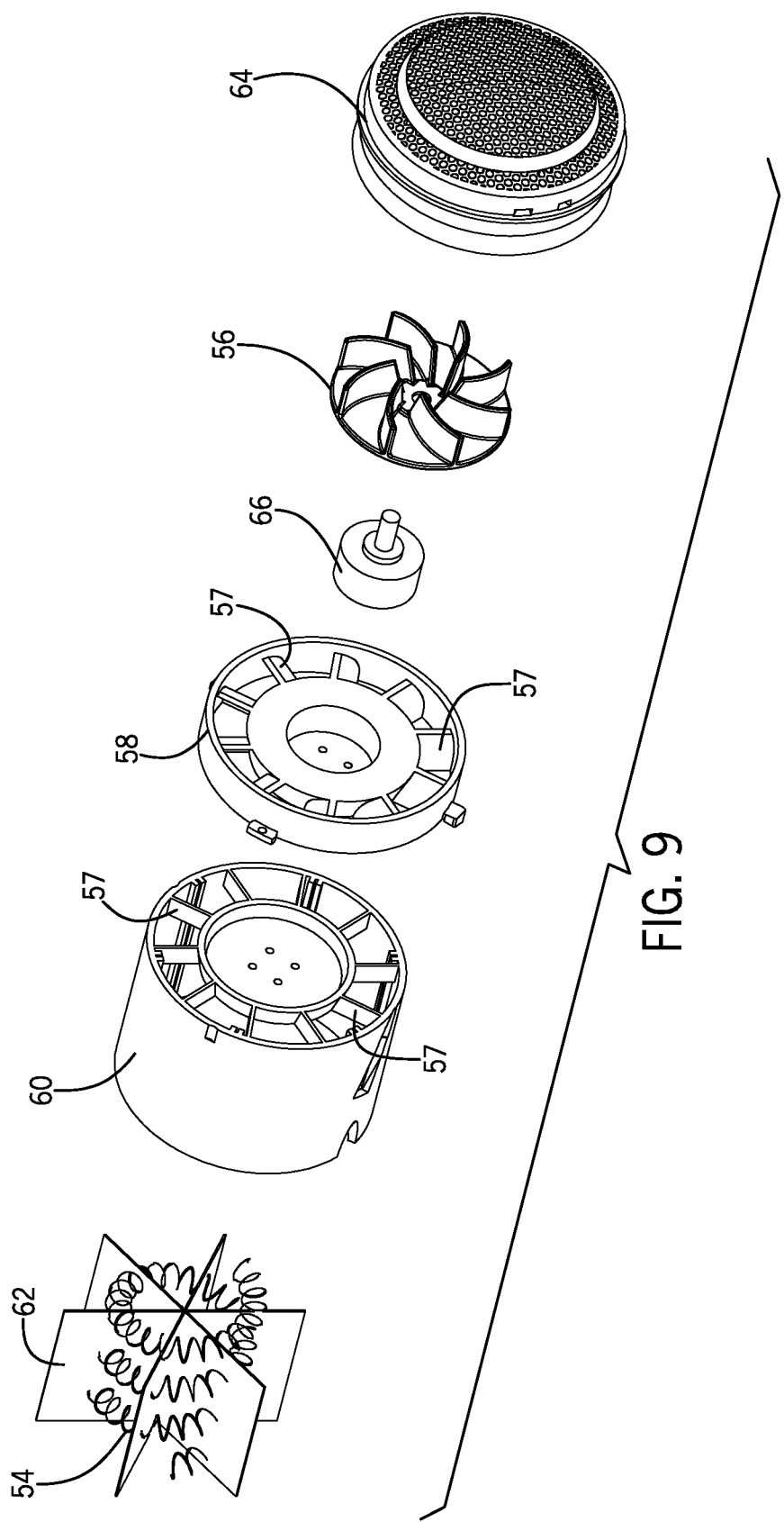
FIG. 9 is an exploded perspective view of the heating assembly of FIG. 6.
Figure 10:
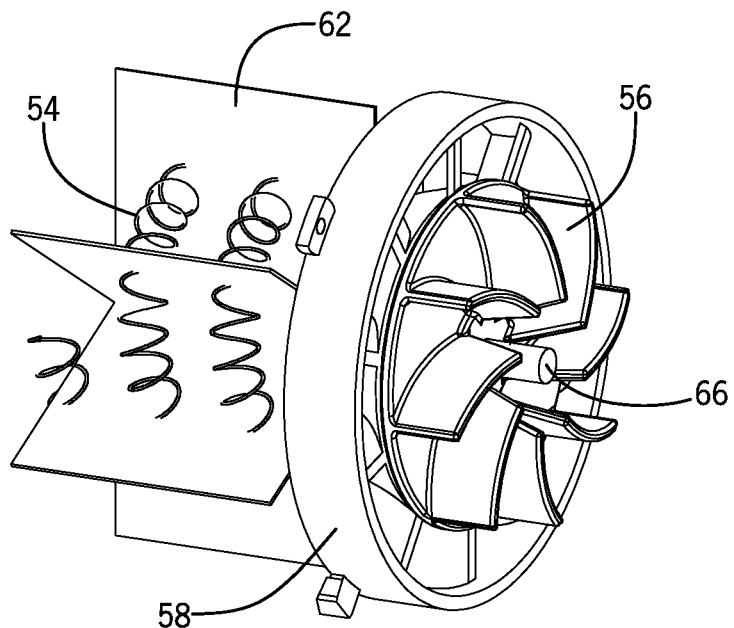
FIG. 10 is a perspective view of the heating assembly of FIG. 6 with a duct removed so the heating coil is visible.
Figure 11:
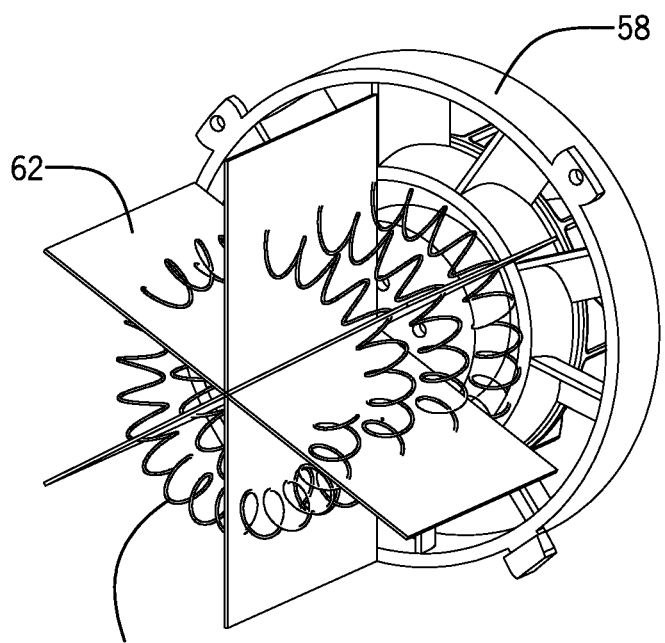
FIG. 11 is another perspective view of the heating assembly of FIG. 6 with the duct removed so the heating coil is visible.

Turning now to FIGS. 4-5, the packaging of the internal components of battery operated hair dryer 10 are shown. As shown, heating assembly 50 is included inside top section 52. Control switches 44 and part of battery pack 16 are included in middle section 42. Battery management and control module 40 is included between top section 52 and middle section 42. Finally, part of the battery pack 16 is also included in bottom section 32.

FIG. 6 is a detail section view showing the positioning of light ring 26 in relation to outlet 25 and retention ring 30. In the embodiment shown, retention ring 30 is snap fit onto outlet 25, but any suitable means of attachment may be used without departing from the invention. Light ring 26 includes a plurality of light emitting diodes (LEDs) 25 distributed around the ring. Light ring 26 may selectively illuminate while the battery operated hair dryer is in operation or at any other desired time. In some embodiments, the LEDs 25 may be able to produce a variety of desired colors and may also be able to selectively flash or otherwise illuminate in any desired configuration. In a preferred embodiment, light ring 26 may illuminate red when hair dryer 10 is in operation and is heating air.

Turning now to FIGS. 7-11, one embodiment of a heating assembly 50 is shown. Heating assembly 50 includes a heating element 54, a fan 56, fan housing 58, duct 60, duct support guides 62, intake 64, and a motor 66. Heating assembly 50 is disposed within top section 52 of main housing 20. In the embodiment shown, heating element 54 is a resistive heating coil, but any suitable heating element may be used without departing from the invention. Motor 66 is a brushless three-phase motor, which is a very energy efficient motor, has decreased vibration compared to other motors, and the speed of the motor can be precisely modulated between 0-100% to optimize performance and energy consumption as needed.

When air is moved through fan 56, the fan induces swirl (also called vortices) in the air flow. The swirl does not improve the performance of fan 56, but it consumes energy. It is desirable, then, to de-swirl the air after it passes through fan 56 because doing so improves the efficiency of the fan. To de-swirl the flow, a plurality of stator vanes 57 are included in fan housing 58 and duct 60. Stator vanes 57 direct air coming off of fan 56 and directs it toward heating element 54. In addition to stator vanes 57, duct 60 also includes duct support guides 62, which further prevent air from swirling through duct 60. In some embodiments it may be desirable to only have stator vanes 57 without duct support guides 62 or vice versa. Furthermore, alternative embodiments may do away with both the stator vanes 57 and the duct support guides 62 without departing from the invention.

In the embodiment shown, battery management and control module 40 is positioned between battery pack 16 and heating assembly 50. Battery management and control module 40 includes at least one microprocessor 46 and a storage device 48. Battery management and control module 40 includes a battery management system 68 (BMS) that balances the voltage between the battery cells 18 and controls the charging and discharging of battery pack 16. In addition, BMS 68 continuously measures the voltage of each battery cell 18. To achieve the desired balancing, BMS 68 monitors the temperature of each battery cell 18 via a plurality of temperature sensors 70 that are placed strategically throughout battery pack 16. The BMS 68 takes the temperature information provided by temperature sensors 70 and, combined with the voltage measurements from each cell, determines the condition of battery pack 16 in terms of both state of charge and state of health. State of charge is measured as a percentage, zero to 100%, whereas state of health measures the amount of recoverable capacity battery pack 16 has in comparison to its beginning of life condition. It is well known in the art that the ability of a battery to maintain a charge degrades over time. BMS 68 analyzes state of charge and state of health information before deciding how much safe, allowable current can be discharged or charged at any given time to ensure that battery pack 16 stays within its degradation limits and/or expected use life.

If the voltage varies between battery cells 18, BMS performs a balancing function by controlling the discharge path across any given battery cell to bleed off extra charge. By continually performing the aforementioned balancing function, BMS 68 ensures that the battery cells 18 remain balanced throughout the life of battery pack 16.

In addition to balancing battery cells 18 as described above, BMS 68 also controls the charging and discharging of battery pack 16 so that it is done in a controlled and safe manner. Charging and discharging battery pack 16 and similar batteries presents numerous safety concerns. For example, uncontrolled charging of battery pack 16 may result in an over-voltage condition in one or more battery cells 18 that could result in over-heating or fire, in extreme cases. On the opposite end of the spectrum, uncontrolled discharge of battery pack 16 is also problematic. Uncontrolled discharge of battery pack 16 may result in an under-voltage condition that, on its own, is not dangerous. However, if a user were then to attempt to charge an under-voltage battery cell 18, it could result in premature battery pack 18 degradation, over-heating, or fire. To prevent such unsafe conditions, BMS 68 continuously monitors the voltage in battery cells 18 and includes voltage cut-offs for both over and under voltage conditions in battery cells 18 and battery pack 16.

In some embodiments of hair dryer 10, BMS 68 "knows" how much energy is present in battery pack 16 and can adjust and modify the heating and blowing profile of the hair dryer to ensure that the hair dryer performs optimally given the amount of charge present in the battery pack. Of course, BMS 68 may adjust the performance of hair dryer 10 in any other desired manner without departing from the invention.

FIGS. 12 and 13 show battery pack 16 in greater detail. In the embodiment shown, battery pack 16 is a rechargeable lithium-ion battery comprising eight (8) individual battery cells 18. Battery pack 16 is electrically connected to battery management and control module 40, which controls how electricity is drawn from battery pack 16 as well as how the battery pack is charged. Of course, alternative embodiments of battery pack 16 may include more or less battery cells 18 in any suitable configuration, and may also use any suitable battery type without departing from the invention.

Each battery cell 18 includes two terminals 19, which extend from one end of each battery cell. In the embodiment shown, the terminals 19 extend through terminal slots 72 in a terminal consolidation board 74. In the embodiment shown, terminal consolidation board 74 is a printed circuit board, but any suitable substrate may be used without departing from the invention. Terminals 19 are in electrical contact with terminal slots 72, which allow for the movement of terminals 19 due to any expansion or contraction of battery cells 18. Terminal consolidation board 74 electrically combines battery cells 18 into battery pack 16, which minimizes the necessary connections between battery pack 16 and BMS 68. In the embodiment shown, battery pack 16 includes two terminal consolidation boards 74, 75, which are electrically connected to each other. In the embodiment shown, battery pack 16 is electrically connected to BMS 68. Finally, battery pack 16 further includes a charging port 76, into which a user may insert a charging cable 78 to charge the battery pack as needed. Charging port 76 may be any suitable port including, but not limited to a USB port.

In an alternative embodiment, battery pack 16 may be capable of wireless, or inductive charging, negating the need for charging port 76. In yet another alternative embodiment, battery operated hair dryer may include at least one solar cell, which would use solar energy to charge battery pack 16. Solar charging would be particularly advantageous if hair dryer 10 were to be used where there is no access to a charging source, such as a campsite. In such an alternative embodiment, it may also be possible to use battery pack 16 to provide power for other devices, such as a user's cell phone, in a manner similar to other supplementary battery packs that are well known in the art.

In addition to balancing the charge of battery cells 18, battery management and control module 40 may also optimize performance of battery operated hair dryer 10 in a wide variety of ways. Battery management and control module 40 has the capability to control fan speed and heating output in any desirable way. Most importantly, battery management and control module 40 optimizes the performance of hair dryer 10 so that the user will be satisfied with the hair drying performance. In one desired drying profile, the application of heat is highest at the beginning of the drying cycle because the hair is typically wettest at that point. As the drying cycle continues, the heat output may reduce without degrading performance because the hair will not be as wet and because decreasing the temperature will avoid damaging the hair. Additional drying profiles may be stored on storage device 48. Such additional drying profiles may be preloaded onto storage device 48, may be "learned" by battery management and control module 40 by analyzing how a user uses hair dryer 10, may be programmed by a user, or may be created by any other desired means without departing from the invention.

Battery management and control module 40 is a necessary component to enable the use of batteries to power a hair dryer. As a result, the presence of an intelligent control module opens the possibilities to what can be done with a hair dryer. In some embodiments of battery operated hair dryer 10, for example, temperature sensors 80 (See FIGS. 3 and 5) may be included near intake 64 and near outlet 25. Temperature sensors 80 would measure ambient temperature in the room and be able to compare that data to the temperature of the air exiting hair dryer 10. Depending on the difference in air temperature at intake 64 and outlet 25, battery management and control module 40 can optimize the amount of current that passes through heating element 54, or can adjust the speed of fan 56 as desired.

Battery operated hair dryer 10 may include additional environmental sensors including, but not limited to, humidity sensors, an infrared thermometer to measure hair or skin temperature, or any other desired sensor. Furthermore, additional components may be included in hair dryer 10 and connected to battery management and control module 40. For example, a camera could be included near the outlet 25, which would allow battery management and control module 40 to analyze and learn the user's hair type, length, etc. and automatically adjust the fan speed or heat output to most efficiently dry the user's hair. Hair dryer 10 may also include at least one Bluetooth radio 82, wi-fi antenna 84, or other means to connect the hair dryer to the internet or to an internet connected device such as a smartphone or tablet computer. Once hair dryer 10 is connected to the internet or to a smartphone, tablet computer, or other device, the battery management and control module 40 could control the hair dryer based on any number of external factors. Taken to the extreme, hair dryer 10 could optimize performance, based on time of day, location, local weather etc. Furthermore, if the user has a connected device in their home such as a thermostat, hair dryer 10 could obtain temperature and/or humidity data from the thermostat to determine the optimal fan speed and temperature to dry the user's hair.

In some embodiments of battery operated hair dryer 10, a microphone and speaker may be included in housing 20. The microphone and speaker may be used for any purpose including, but not limited to producing sound to actively cancel noise produced by hair dryer 10. To cancel noise produced by hair dryer 10, the microphone picks up noise produced by the hair dryer. Next, battery management and control module 40 creates a noise-cancelling wave that is 180° out of phase with the noise produced by the hair dryer. The noise-cancelling wave effectively cancels out the noise of hair dryer 10, greatly improving the user experience. In addition to using the speaker to produce the noise-cancelling wave, the speaker may also be used to play music or make any other desired sound.

Turning now to FIGS. 15-18, an alternative embodiment of a battery operated hair dryer 200 in accordance with the invention is shown. Battery operated hair dryer 200 is similar in many ways to the previously described embodiment, except battery operated hair dryer 200 includes a heating assembly 210 that heats the air using at least one peltier device 212 rather than a resistive heater. Peltier devices, also known as thermoelectric generators, are well known in the art. Peltier devices comprise an array of alternating n- and p-type semiconductors. The array of elements is soldered between two ceramic plates, electrically in series and thermally in parallel. When a current passes through one or more pairs of elements from n- to p-type, there is a decrease in temperature at the junction (the "cold side"), resulting in absorption of heat from the environment. That heat is carries along the elements by electron transport and are released on the opposite ("hot") side as the electrons move from a high to low energy state. Typical single stage peltier devices are capable of producing temperature differences between the hot and cold side of around 70 degrees Celsius (158 degrees Fahrenheit).

In the embodiment shown in FIGS. 15-18, peltier devices 212 each have a hot side 214 and a cold side 216. A plurality of heat sinks 218 are thermally connected to the peltier devices 212. Upstream from heating assembly 210 is a motor 220 attached to a fan 221 that blows air over and through the heating assembly. Immediately downstream from heating assembly 210, an exit duct 222 funnels heated air that has passed through heating assembly 210 toward and out outlet grille 28. Air that passes around heating assembly 210 is cooled as it passes through heat sinks 218. The cool air cannot exit hair dryer 200 through outlet grille 28 because it is blocked by exit duct 222. Rather, the cooled air is directed elsewhere, and may be directed toward battery pack 16 to aid in cooling the battery pack. Of course, alternative configurations of peltier devices and heat sinks may be used without departing from the invention.

What is claimed is:

1. A hair dryer comprising:
 a housing having a top section, a middle section, and a bottom section, the top section including an air inlet and an air outlet;
 a rechargeable battery pack including a plurality of lithium-ion battery cells, the rechargeable battery pack disposed within the middle section and the bottom section;
 each battery cell having a discharge path, a recoverable charge capacity, and a state of charge, the state of charge measured as a percentage of recoverable charge capacity;
 a plurality of temperature sensors that sense temperature for each battery cell;
 a plurality of voltage sensors that measure voltage for each battery cell;
 at least one switch to control operation of the hair dryer;
 a heating assembly disposed within the top section of the housing which draws ambient air into the air inlet and expels air through the air outlet, the heating assembly including a fan driven by a motor and at least one heating element;
 the heating assembly positioned such that air passing through the heating assembly may be heated to a temperature greater than the ambient air temperature;
 the battery pack electrically connected to a battery management and control module comprising a printed circuit board, the printed circuit board positioned above the battery pack and disposed substantially between the top section and the middle section to provide a barrier between the battery pack and the heating assembly;
 the battery management and control module electrically connected to the heating assembly, wherein the battery management and control module adjusts an electrical current delivered from the battery pack to the heating assembly to optimize the drying performance of the hair dryer and the performance of the battery pack; and
 the battery management and control module capable of balancing the charge among the plurality of battery cells by controlling the discharge path across any of the battery cells to bleed off extra charge, wherein the plurality of battery cells in the battery pack include a first group of battery cells housed in the middle section, and a second group of battery cells housed in the bottom section, and wherein each battery cell includes two terminals and each terminal of the battery cells in the first group extends through a corresponding slot on a first terminal consolidation board, and each terminal of the battery cells in the second group extends through a corresponding slot on a second terminal consolidation board.

2. The hair dryer of claim 1, wherein the heating assembly includes a resistive heating coil.

3. The hair dryer of claim 1, wherein the motor is a brushless three-phase electric motor.

4. The hair dryer of claim 1, wherein the heating assembly further includes a plurality of stator vanes that straighten airflow through the heating assembly.

5. The hair dryer of claim 1, further including a battery indicator that visually displays the state of charge of the battery pack.

6. The hair dryer of claim 1, further including a light ring located near the outlet, wherein the light ring comprises at least one LED.

7. The hair dryer of claim 1, wherein the battery management and control module adjusts fan speed and the amount of current supplied to the heating element based on the temperature of the battery cells.

8. The hair dryer of claim 1, wherein the battery management and control module balances the charge of the battery cells based on the temperature of the battery cells.

9. The hair dryer of claim 1, wherein the first group of battery cells is spaced from the second group of battery cells by the second terminal consolidation board.

\* \* \* \* \*